United States Patent [19]

Swanger

[11] 4,333,215
[45] Jun. 8, 1982

[54] BEARING MATERIAL AND METHOD OF MAKING

[75] Inventor: Lee A. Swanger, Euclid, Ohio
[73] Assignee: Gould Inc., Rolling Meadows, Ill.
[21] Appl. No.: 49,102
[22] Filed: Jun. 18, 1979
[51] Int. Cl.³ ............................................. B21D 53/10
[52] U.S. Cl. ................................ 29/149.5 S; 427/292; 427/329; 427/433; 427/405
[58] Field of Search ................ 29/420, 420.5, 149.5 S, 29/149.5 DP, 149.5 R; 427/292, 329, 433, 405

[56] References Cited

U.S. PATENT DOCUMENTS 3,180,008  4/1965  Elderkin et al. ................ 29/149.5 S
4,071,643  1/1978  Pratt et al. ...................... 29/149.5 S Primary Examiner—Lowell A. Larson
Assistant Examiner—V. K. Rising Attorney, Agent, or Firm—Russell E. Baumann

[57] ABSTRACT

A process for making a multilayer bearing material is provided which comprises a backing layer, an intermediate layer of aluminum and an outer overlay layer. The backing layer and aluminum layer are roll bonded together to form a composite strip which is then fed into a molten bath of overlay material which provides for good adhesion to the aluminum and also for good bearing material properties. The aluminum surface of the composite is then cleaned to remove surface oxide and the composite is removed from the bath into a guide means and through a gate which controls the thickness of the overlay so that upon solidification of the molten overlay material a finished bearing material is produced. The fusion bonding of overlay material to the composite is performed in a single operation.

11 Claims, 3 Drawing Figures

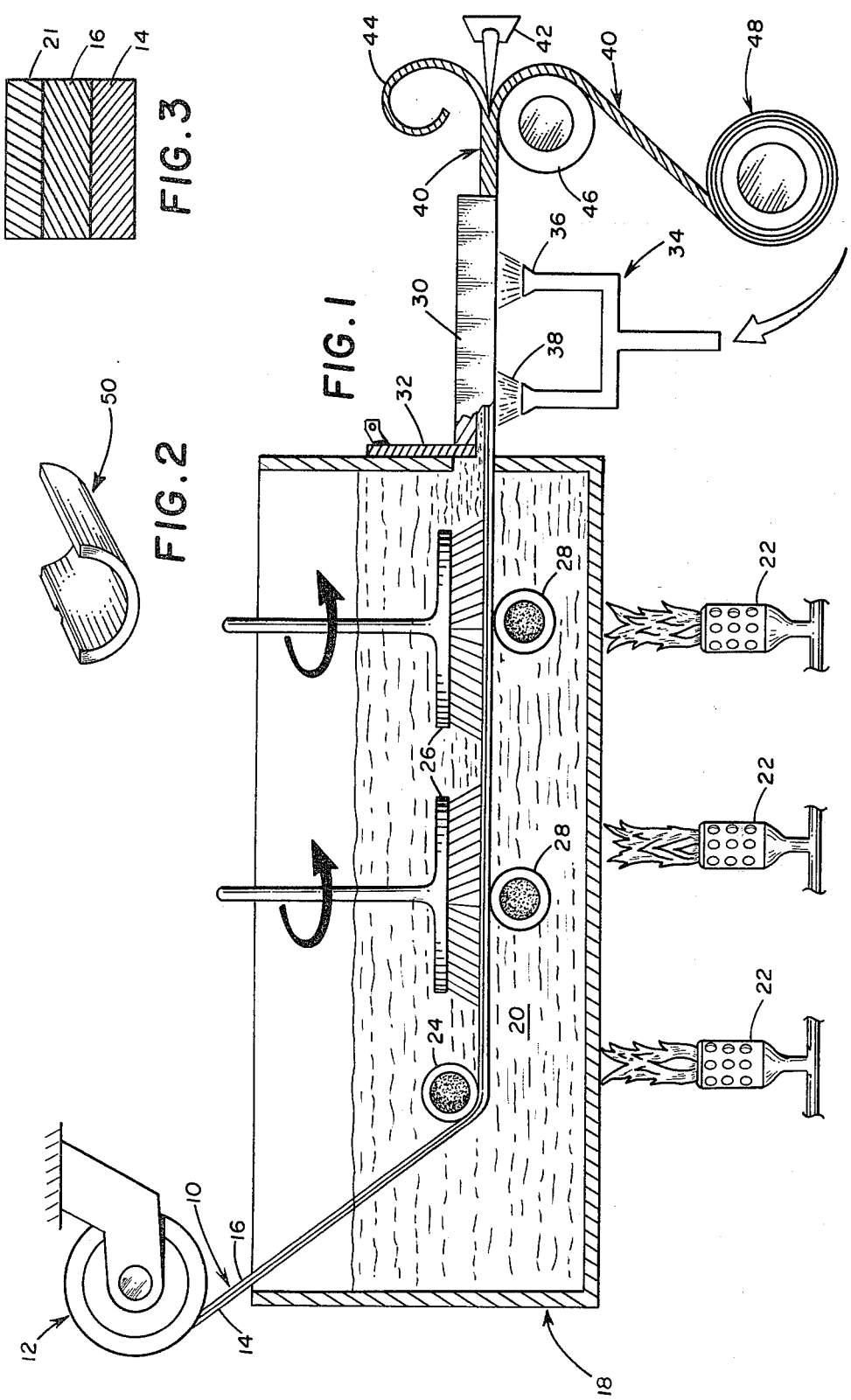

4,333,215

BEARING MATERIAL AND METHOD OF MAKING

BACKGROUND AND SUMMARY OF INVENTION

The present invention relates to motor vehicle bearings and materials therefor and more particularly to a multilayer metallic bearing material which has a layer of aluminum or aluminum-base alloy, and to a process for making the bearing and bearing materials.

It is to be understood when the word aluminum is used in the present application it is intended to mean aluminum and aluminum-base alloys. Additionally, the word overlay as is known in the art is being used to denote that surface layer of a multilayer bearing material that actually comes in contact with a journal or other moving part.

It is known in the prior art to make a multilayer bearing with a backing layer of steel, an intermediate layer of aluminum and a top bearing surface or overlay. The adherence of the overlay on the aluminum surface has always been a problem. Conventionally, the overlay layer is electroplated onto the aluminum surface of the steel and aluminum composite in a multi-step plating process. This multi-step plating operation is expensive to perform and, due to its complexity, difficult to control. In many cases the bearing material may have to be passed through four or more separate plating baths and numerous auxiliary operations. Additionally, the bearing is typically electroplated in its final shape which may be that of a semicylindrical shell. This mode of operation means each bearing has to be individually handled on plating jigs or racks to yield a uniform, reliable plate.

It is also known in the prior art, as described in U.S. Pat. No. 4,071,643 to produce a multilayer bearing material with an aluminum intermediate layer by tinning or coating the aluminum surface and then casting the overlay on the coated aluminum surface. This method produces a bearing material which requires two distinct process operations; a coating step and an overlay-casting step. This multi-step process is expensive and can lead to reliability problems.

Accordingly, it is an object of the present invention to provide an improved multilayer bearing having a layer of aluminum and the process for making the bearing material.

It is another object of the present invention to provide a process for making a multilayer bearing material which is highly reliable and low in cost to manufacture.

It is yet another object of the present invention to provide a process for making a continuous uniform strip for bearings.

It is still another object of the present invention to provide a process for making bearing material which has good performance characteristics in both wear resistance and fatigue resistance.

It is yet still another object of the present invention to provide a method of applying an overlay layer on the aluminum layer of a multilayer bearing material in a single-step operation. Other objects and features will be in part apparent and in part pointed out hereinafter.

Accordingly, one aspect of the present invention concerns a multilayer bearing material which comprises bonding an outer overlay material to an aluminum layer of an aluminum-on-steel composite in a single operation.

Another aspect of the present invention concerns a method for making a bearing material comprising providing a composite material with a steel backing layer and an intermediate aluminum layer bonded to the steel and passing the composite material through a molten bath of an overlay material to securely bond the overlay material to the aluminum layer of the composite.

Still another aspect of the present invention concerns a method of making a bearing material comprising providing a composite material strip with a steel backing layer and an intermediate aluminum layer bonded to the steel, passing the composite strip through a molten bath of overlay material suitable for providing good adhesion to the aluminum layer, removing surface oxide from the aluminum layer thereby allowing uniform adherence of the molten material to the aluminum layer, and removing the composite strip from the bath and simultaneously controlling the uniform thickness of the overlay over the width of the strip.

Yet still another aspect of the present invention concerns a method of making a bearing material comprising providing a composite material strip with a steel backing layer and an intermediate aluminum layer bonded to the steel, passing the composite strip through a molten lead, tin, and zinc alloy bath of overlay material, removing surface oxide from the aluminum layer and removing the composite strip from the bath and simultaneously controlling uniform thickness of the overlay over the width of the strip.

DESCRIPTION OF THE DRAWINGS

The invention may be carried into practice in various ways and the preferred embodiments will be described by way of description and examples with reference to the accompanying drawings.

In the drawings:

FIG. 1 is a partly diagrammatic side view of the process for producing bearing material in accordance with this invention;

FIG. 2 is a perspective view of a conventional and typical bearing structure; and FIG. 3 is a typical cross-section of the final bearing.

DESCRIPTION OF THE PREFERRED EMBODIMENTS OF THE INVENTION

Referring now to the drawings, there is shown a continuous composite strip 10 fed from a coiler 12 with a backing layer 14 preferably bonded to an aluminum layer 16. Conveniently, the steel layer is low carbon steel and the aluminum layer is an aluminum alloy having 4% by weight silicon, 1% by weight cadmium, 0.15% by weight copper, 0.20% by weight magnesium and the balance aluminum. It is to be understood the above described metals for layers 14 and 16 are for exemplary purposes and that other steels and other aluminum alloys or pure aluminum could equally well be used.

The bonding of the aluminum layer 16 to steel layer 14 to form the composite is preferably a metallurgical roll bond as is known in the art. The composite strip 10 is then fed into a tank 18 containing a bath of molten material 20. Tank 18 is heated by a conventional heating means 22 such as gas burners to keep the molten bath material 20 at a desired temperature.

In accordance with this invention bath 20 contains a molten matallic material which provides for good adhesion to the aluminum and also good bearing material properties (i.e., wear resistance, fatigue resistance, corrosion resistance and seizure resistance). A good overlay bearing material 21, as best shown in FIG. 3, is a lead/tin alloy with between 0.2% by weight and 6% by weight zinc and/or cadmium. The zinc and/or cadmium provide for strong adherence to the aluminum and added strength to the overlay bearing layer. This improved bonding of the overlay to the aluminum surface greatly increases the reliability of the end produced bearing. Additionally, copper can be added to the overlay alloy up to its admissibility level to further provide added strength. A specific preferred alloy composition of the bath is 88% by weight lead, 10% by weight tin and 2% by weight zinc. This alloy provides for good adhesion to the surface of the aluminum and also for good bearing material properties.

As the composite strip is fed below the surface of bath 20, it may be passed under a roll 24 to help keep the strip aligned and straight across its width. The aluminum surface of the strip is then cleaned while immersed in the bath to remove the oxide layer on the aluminum. The aluminum surface may be cleaned by brushes 26 powered by motors (not shown) or by other conventional means such as ultrasonics. The strip is supported by rolls 28 or the like while being cleaned.

As the strip exits from the bath it is supported by a sided guide member 30 typically made out of graphite. The guide member supports the strip on the bottom and side to help keep the strip aligned and also to help to contain the overlay material while still molten. An adjustable gate or weir member 32 positioned directly at the exit point of the strip from the molten bath controls the height of the overlay material being bonded to the composite strip. The gate is typically positioned to allow the overlay thickness to be greater than desired so a finish skive operation can be performed as will be more fully described below.

A cooling means 34 is provided to cool the strip as it leaves the bath. The cooling means may be a conventional quench sprayer 36 which sprays a coolant 38 on the guide member 30 to cause solidification of the overlay material.

Accordingly, a trilayer strip 40 with the overlay material solidified is then passed preferably through a skiving means 42 which is adjustable to remove the portion of the overlay layer that is desired to yield a uniform overlay thickness that is required for use on a bearing material. Skiving means 42 may be of the conventional knife type which removes unneeded material 44 as strip 40 is supported on roll 46. The material removed during the skiving operation can be put directly back into the bath to be remelted. The trilayer strip is then taken up on a coiler 48 ready for conventional bearing forming operations as are known in the art to produce a finished bearing 50 as shown in FIG. 2. This strip does not need a further overlay casting operation or a plating operation.

The following invention will now be described with reference to the following examples.

EXAMPLE I

A continuous composite strip of 0.070 of an inch thick is formed from roll bonding a backing layer of 1008 steel to an aluminum alloy having 4% by weight silicon, 1% by weight cadmium, 0.15% by weight copper, 0.20% by weight magnesium and the balance aluminum, known as Society of Automotive Engineers Alloy No. 781. This continuous strip is then fed at a speed of 12 ft/min into a molten bath of overlay material having 88% by weight lead, 10% by weight tin and 2% by weight zinc operated at a temperature of 690° F. The strip while immersed under the surface of the bath has the aluminum surface scrubbed by wire brushes operating at 1000 rpm to remove all of the surface oxide. Next the strip is removed from the bath into a graphite guide through a gate set to control molten overlay thickness at 0.015 of an inch. Then the strip is cooled by a water spray hitting the guide so that the overlay solidifies and can be skived back by a knife blade type tool to 0.005 of an inch and coiled up.

EXAMPLE II

The process of Example I is repeated except the molten bath composition is 88% by weight lead, 10% by weight tin and 2% by weight cadmium operated at a temperature of 700° F.

EXAMPLE III

The process of Example I is repeated except the molten overlay thickness is 0.006 of an inch and the skiving operation is eliminated.

EXAMPLE IV

The process of Example I is repeated except the molten bath composition is 87% by weight lead, 9% by weight tin, 2% by weight cadmium and 2% by weight zinc operated at a temperature of 690° F.

EXAMPLE V

The process of Example I is repeated except the molten bath composition is 87.5% by weight lead, 10% by weight tin, 2% by weight zinc and 0.5% by weight copper operated at a temperature of 700° F.

Accordingly, the above described invention provides for a method of making a multilayer bearing material having an aluminum interlayer in which an overlay layer is securely bonded to the aluminum in a single operation. The reliability and expense problems with electroplating and with an extra casting operation are eliminated. The overlay material is chosen to provide for strong adherence to the aluminum layer and to also provide superior bearing material properties.

The invention has been described herein with reference to various embodiments thereof. Obviously, modifications and alterations will occur to others upon the reading and understanding of the specification. It is my intention to include all such modifications and alterations insofar as they come within the scope of the appended claims or the equivalent thereof.

I now claim:

1. A method for producing a multilayer metallic bearing material which has an interlayer of aluminum or aluminum-base alloy comprising:
   providing a composite strip of a backing material bonded to said aluminum or aluminum-base alloy;
   passing the composite strip below the surface of a bath of a molten bearing overlay material;
   removing surface oxide from the surface of the aluminum or aluminum-base alloy layer while under the surface of the bath thereby allowing uniform adherence of the molten overlay material to the aluminum or aluminum-base alloy interlayer; and
   withdrawing the composite strip from the bath and simultaneously controlling uniform thickness of the overlay material on the interlayer over the width of the strip thereby providing the bearing material with bonded overlay layer of the ultimate bearing surface material upon solidification without the need of further casting step.

2. The method as set forth in claim 1 further including skiving the overlay material after solidification.

3. The method as set forth in claim 1 wherein said bath of overlay material comprises an alloy of lead and tin and at least one metal chose from the group consisting of zinc, cadmium and copper.

4. The method as set forth in claim 1 wherein said bath of overlay material comprises an alloy of lead, tin and zinc.

5. The method as set forth in claim 1 wherein said bath of overlay material comprises an alloy of lead, tin and cadmium.

6. The method as set forth in claim 1 wherein controlling uniform thickness of the overlay is by sided guide and a gate member.

7. A method for producing a multilayer metallic bearing which has an interlayer of aluminum or aluminum-base alloy comprising:
providing a composite strip of a backing material bonded to said interlayer;
passing the composite strip below the surface of a bath of molten bearing overlay material of an alloy of lead and tin and at least one metal chosen from the group consisting of zinc, cadmium and copper;
removing surface oxide from the surface of the interlayer while under the surface of the bath thereby allowing uniform adherence of the molten overlay material to the interlayer;
withdrawing the strip from the bath and simultaneously controlling uniform thickness of the overlay material on the interlayer over the width of the strip thereby providing a bearing material with bonded overlay layer of the ultimate bearing surface material upon solidification without the need of further casting step;
forming the composite strip with overlay layer into bearing shell.

8. A method for producing a bearing as set forth in claim 7 further including skiving the overlay material after solidification prior to forming the bearing shell.

9. The method for producing a bearing as set forth in claim 8 wherein said alloy comprises lead, tin and zinc.

10. A method for producing a multilayer metallic bearing material which has a layer of aluminum or aluminum-base alloy comprising:
providing a strip having at least one surface of aluminum or aluminum-base alloy;
passing said strip below the surface of a bath of a molten bearing overlay material;
removing surface oxide from the surface of the aluminum or aluminum-base alloy layer while under the surface of the bath thereby allowing uniform adherence of the molten overlay material to the aluminum or aluminum base-alloy layer; and
withdrawing the strip from the bath and simultaneously controlling uniform thickness of the overlay material on the aluminum or aluminum-base alloy layer over the width of the strip thereby providing the bearing material with bonded ultimate overlay layer of the ultimate bearing surface material upon solidification without the need of further casting step.

11. A multilayer metallic bearing material produced according to the method of claim 1.

* * * * *